March 8, 1949.  J. JANDASEK  2,464,088
FLUID TRANSMISSION
Filed Nov. 26, 1943
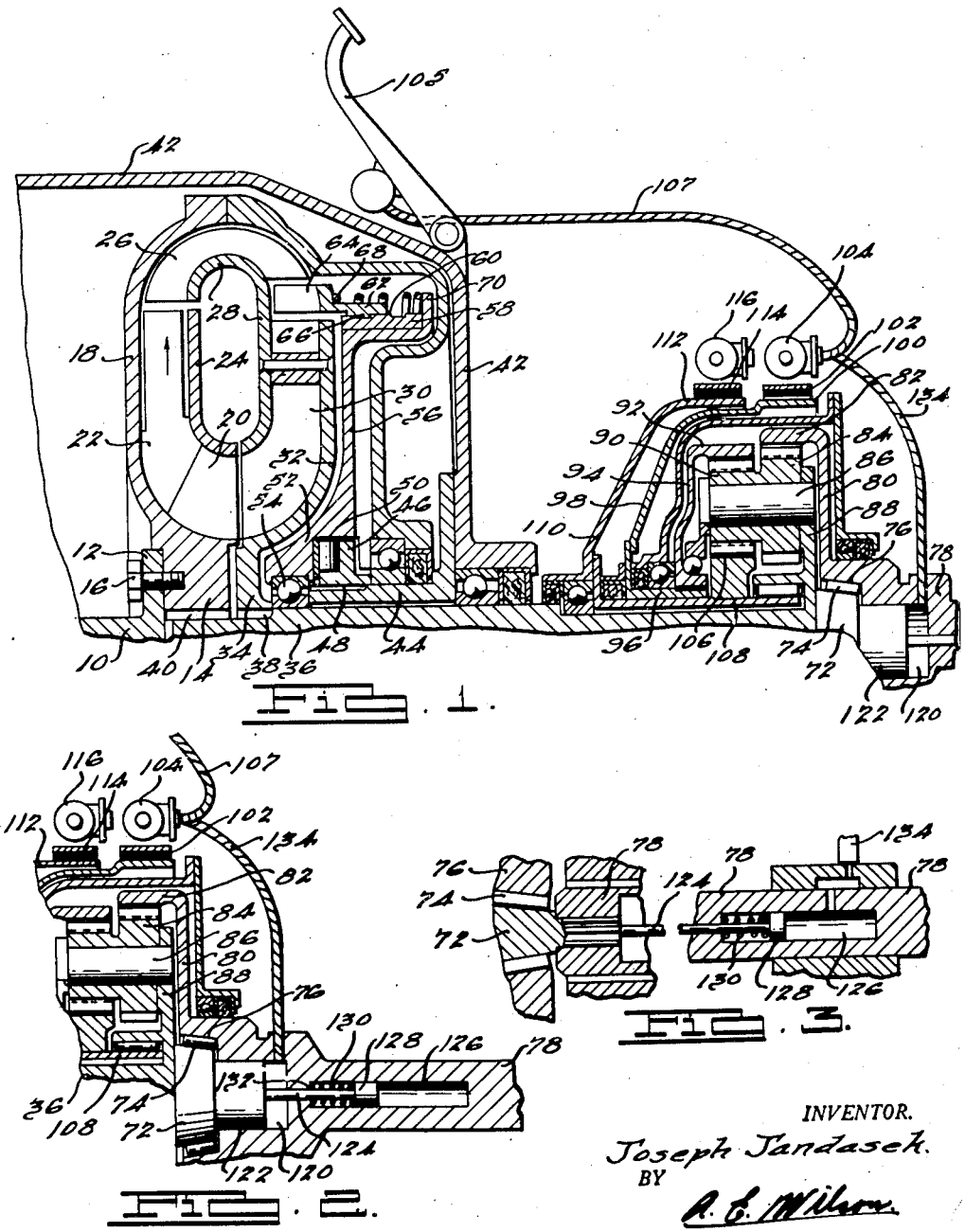
INVENTOR.
Joseph Jandasek.
BY
ATTORNEY.

Patented Mar. 8, 1949

2,464,088

UNITED STATES PATENT OFFICE 2,464,088

FLUID TRANSMISSION

Joseph Jandasek, Highland Park, Mich., assignor to Bendix Aviation Corporation, South Bend, Ind., a corporation of Delaware Application November 26, 1943, Serial No. 511,798

2 Claims. (Cl. 74—189.5)

This invention relates to transmissions and more particularly to combined fluid and mechanical transmissions to provide greater flexibility in the transmission of power.

An object of this invention is to provide a power transmitting device having fluid and mechanical transmissions positioned at opposite ends of a member interposed between driving and driven shafts to permit the efficient transmission of power at a plurality of torque multiplying ratios.

A further object of the invention resides in the provision of a transmission having driving and driven shafts connected for direct drive and having planetary gearing positioned between the driving and driven shafts to provide over-drive and reverse speeds.

Another object of the invention is to provide planetary gearing associated with driving and driven shafts having one-way direct driving means positioned therebetween and wherein means are provided to render the direct drive inoperative upon actuation of the planetary gearing.

Still a further object of this invention resides in the provision of fluid pressure actuated means associated with planetary gearing to render inoperative a direct drive between driving and driven shafts upon actuation of the planetary gearing.

Still another object of the invention is to provide fluid pressure operated means to render inoperative the driving means between two shafts.

Another object resides in the provision of a novel one-way driving mechanism having manually controlled means to render the drive inoperative.

Yet a still further object of the invention is to provide a one-way drive having speed responsive means to render the drive inoperative.

Another object is to provide a transmission having planetary gearing interposed between driving and driven shafts wherein manually operable means are provided to actuate the planetary gearing to vary the speed ratio of the driving and driven shafts and to automatically interrupt direct driving means between the driving and driven shafts upon actuation of the planetary gearing control mechanism.

Other objects and advantages of this invention will be apparent from the following detailed description considered in connection with the accompanying drawings, submitted for purposes of illustration only and not intended to define the scope of the invention, reference being had for that purpose to the subjoined claims.

In the drawings wherein similar reference characters refer to similar parts throughout the several views:

Fig. 1 is a longitudinal sectional view of a transmission embodying the present invention.

Fig. 2 is a fragmentary view illustrating the control mechanism for the planetary gearing illustrated in Fig. 1.

Fig. 3 is a fragmentary sectional view illustrating a modified form of control mechanism.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to Fig. 1 it will be observed that an engine crankshaft 10 is provided with a radially extended flange 12 to which an impeller hub 14 is secured as by bolts 16. The impeller hub 14 carries an impeller web 18 having thereon fluid energizing vanes 20 and 22 supporting an impeller shroud 24 secured thereto.

The impeller web 18 is extended to over-lie an energy absorbing turbine member including first section energy absorbing vanes 26 carried by a turbine shroud 28, and section turbine vanes 30 interposed between the turbine shroud 28 and a turbine web 32 carried by a turbine hub 34 secured to a driven shaft 36 as by splines 38.

The driven shaft 36 is aligned with the crankshaft 10 and is received by a pilot bearing 40 in the impeller hub 14. A stationary member 42 has an axially extended sleeve 44 telescoping the driven shaft 36. A hub 46 is mounted on the stationary sleeve 44 and secured thereto as by means of splines 48. One-way braking means 50 are interposed between the hub 46 and a guide wheel hub 52 mounted on suitable bearings 54 on the driven shaft. The guide wheel hub 52 carries a radially extended flange 56 terminating in an axially extended cylinder 58 having external helical threads 60 adapted to receive a cylindrical guide wheel carrying member 62 mounted thereon.

The member 62 is provided with angularly disposed guide wheel vanes 64 adapted to receive the power transmitting fluid issuing from the first section turbine vanes 26, and rectify its flow to direct it to the second section turbine vanes 30 in such a manner that power may be transmitted from the crankshaft 10 to the driven shaft 36 with torque multiplication. The guide wheel carrying member 62 is provided with internal helical threads 66 adapted to engage the helical threads 60 to move the guide wheel vanes 64 out of or into the power transmitting fluid circuit provided by the cooperating impeller and turbine. A spring 68 interposed between the guide wheel carrying member 62 and a stop member 70 is provided to yieldingly urge the guide vanes 64 into the power transmitting fluid circuit to transform the device to operate as a torque converter to transmit power with torque multiplication.

The driven shaft 36 has a reversely disposed conical end portion 72 adapted to be engaged by a conical one-way driving means 74. The outer perimeter of the one-way driving means 74 is engaged by a female conical driving surface 76 carried by a final driven shaft 78 aligned with the driven shaft 36.

The final driven shaft 78 is provided with a radially extended flange 80 terminating in a ring gear 82 receiving pinions 84 carried by planet pins 86 fixed to a radially extended flange 88 on the driven shaft 36.

The pinions 84 are integral with pinions 90 of smaller diameter and received by a ring gear 92 on a radially extended flange 94 secured to a sleeve 96 supporting a radially extended flange 98 terminating in an axially extending cylinder 100 positioned to be engaged by the friction lining 102 of a brake band actuated by a hydraulic unit 104 to effect reverse drive. The unit 104 may be actuated by a lever 105 to direct liquid through a conduit 107 to the cylinder of the unit 104.

The pinions 90 also mesh with a sun gear 106 splined or suitably secured to a sleeve 108 surrounding the driven shaft 36 and having a radially extended flange 110 terminating in a cylinder 112 adapted to be held against rotation by a brake band 114 actuated by a cylinder 116 to effect an over-drive.

The driven shaft 78 is provided with a chamber 120 adapted to receive a piston 122 having rod 124 secured thereto and extended into a cylinder 126. The rod 124 is provided with a head 128 slidably mounted in the cylinder 126. Yielding means such for example as a spring 130 may be interposed between the head 128 and the inner end 132 of the cylinder 126 to yieldingly urge the driven shaft 36 and the final driven shaft 78 toward each other to engage the one-way driving means 74 to effect direct drive from the shaft 36 to the final driven shaft 78.

A conduit 134 from the hydraulic unit 104 communicates with the chamber 120 to subject the space between the piston 122 and the chamber 120 to fluid pressure upon actuation of the hydraulic unit 104 by the pedal 105 to effect reverse drive. When the chamber 120 is thus subjected to hydraulic pressure the piston 122 is urged to the left whereupon the driven shaft 36 and the final driven shaft 78 are separated slightly to automatically release the one-way driving means 74 and to permit the final driven shaft 78 to rotate in the reverse direction.

The operation is as follows. Power applied by the prime-mover rotates the crankshaft 10 and power is transmitted through the impeller hub 14 and web 18 to energize liquid in the impeller channel provided by the vanes 20 and 22 interposed between the impeller web and shroud members 18 and 24.

Energized liquid is directed to the first section turbine vanes 26 where a portion of the energy is absorbed. When the device is operating as a torque converter to transmit power with torque multiplication and at reduced speed, the guide wheel vanes 64 are positioned in the power transmitting fluid circuit as illustrated in Fig. 1. When operating as a torque converter fluid issuing from the first section turbine is rectified as to flow direction by the guide wheel vanes 64 and it is induced to flow into the second section turbine channel to engage the vanes 30 at such an angle that power may be transmitted with torque multiplication. The remaining energy capable of abstraction from the power transmitting fluid is absorbed by the second section turbine vanes 30 and the total power absorbed from the liquid is directed through the turbine web 32 and hub 34 to the driven shaft 36.

When the power applied to the impeller increases, or the load to which the driven shaft 36 is subjected decreases to such an extent that torque multiplication is unnecessary to transmit the load, the fluid in the power transmitting fluid circuit tends to rotate the guide wheel vanes 64 in the forward direction whereupon the helical threads 66 and 60 shift the guide wheel axially on the member 58 to withdraw the guide vanes 64 from the fluid circuit. The one-way braking means 50 permits the guide wheel assembly to rotate freely in the forward direction with the edges of the guide vanes 64 adjacent the fluid circuit whereupon minimum energy is absorbed by the guide wheel while the device is operating as a fluid clutch to transmit power at a substantially 1:1 ratio with virtually no torque multiplication.

For normal operation the one-way driving means 74 interposed between the driven shaft 36 and the final driven shaft 78 operates to effect a direct drive to the shaft 78 whereupon the shaft 78 receives the entire energy applied to the driven shaft 36. When it is desired to drive the final driven shaft 78 in the reverse direction the pedal 105 may be actuated whereupon fluid pressure is exerted through the conduit 107 to actuate the braking unit 104 to contract the brake band 102 into locking engagement with the cylinder 100 carried by the radially extended flange 98 fixed to the sleeve 96 to lock the ring gear 92 against rotation. When the ring gear 92 is locked against rotation, power applied through the driven shaft 36, flange 88, planet pinions 86 and pinions 84 is effective through the ring gear 92 and flange 80 to rotate the final driven shaft 78 in the reverse direction because of the difference in diameter of the ring gears 92 and 82 and their associated pinion gears 90 and 84 respectively.

Actuation of the hydraulic unit 104 exerts pressure through the conduit 134 to the chamber 120 whereupon the piston 122 carried by the driven shaft 36 is subjected to an axial force tending to separate the driven shaft 36 and the final driven shaft 78. Slight axial movement of these shafts is effective to release the one-way driving means 74 whereupon the final driven shaft 78 is free to rotate in the reverse direction.

When the reverse drive is no longer needed the pedal 105 is released whereupon the brake band 102 releases the cylinder 100 and the fluid pressure in the chamber 120 is released whereupon the spring 130 moves the driven shaft 36 and the final driven shaft 78 axially to engage the one-way driving means 74 whereupon the direct drive from the driven shaft 36 to the final driven shaft 78 is resumed at a 1:1 ratio.

When it is desired to drive the final driven shaft 78 at higher speed than the driven shaft 36 rotates, the hydraulic unit 116 may be actuated by means, not shown, similar to the actuating means for hydraulic unit 104, to contract the brake band 114 into locking engagement with the cylinder 112 whereupon the sun gear 106 carried by the sleeve 108 fixed to the radially extended flange 110 is locked against rotation. Locking of the sun gear 106 is effective through the pinions 90 and 84 and ring gear 82 to rotate the final driven shaft 78 in the forward direction at increased speed. The one-way driving means 74 permits the final driven shaft 78 to rotate at higher speeds than the driven shaft 36, and operates as a bearing to guide the final driven shaft and maintain alignment between the shafts.

Fig. 3 illustrates an embodiment which is similar in many respects to that illustrated in Fig. 2. It will be noted that the conduit 134 from the hydraulic unit 104 subjects the cylinder 126 in the final driven shaft 78 to hydraulic pressure to exert a force to separate the driven shaft 36 and the final driven shaft 78 to separate the conical surfaces 72 and 76 from the one-way driving means 74 to interrupt the transmission of power.

This is a continuation in part of my copending application Serial No. 319,442 filed February 17, 1940 now Patent #2,388,849, Nov. 13, 1945.

I claim:

1. A transmission comprising driving and driven shafts, conical members on the driving and driven shafts, one-way driving means between the conical members, means yieldingly urging one of the conical members toward the other, manually controlled speed increasing and reversing means associated with the driving and driven shafts, and means operated by actuation of either the reverse driving means or the speed increasing means effective to spread the conical members so as to release the one-way driving means.

2. A power transmitting device comprising a driving shaft, a driven shaft aligned with the driving shaft, cooperating driving and driven surfaces between said shafts, one-way driving means between the driving and driven surfaces means yieldingly urging one of the surfaces toward the other so as to engage the one-way driving means, manually controlled reversing means between the driving and driven shafts, and means operated by actuation of the reversing means to release the one-way driving means.

JOSEPH JANDASEK.

REFERENCES CITED

The following references are of record in the file of this patent:

UNITED STATES PATENTS

| Number | Name | Date |
| --- | --- | --- |
| 1,955,880 | Vincent | Apr. 24, 1934 |
| 2,288,057 | Weston | June 30, 1942 |
| 2,293,095 | Anderson | Aug. 18, 1942 |
| 2,293,358 | Pollard | Aug. 18, 1942 |
| 2,312,849 | Pollard | Mar. 2, 1943 |
| 2,333,253 | Jandasek | Nov. 2, 1943 |